(12) United States Patent
Grier et al.

(10) Patent No.: US 10,634,604 B2
(45) Date of Patent: Apr. 28, 2020

(54) AUTOMATED REAL-TIME PARTICLE CHARACTERIZATION AND THREE-DIMENSIONAL VELOCIMETRY WITH HOLOGRAPHIC VIDEO MICROSCOPY

(71) Applicant: NEW YORK UNIVERSITY, New York, NY (US)

(72) Inventors: David G. Grier, New York, NY (US); Fook Chiong Cheong, Singapore (SG); Ke Xiao, Elmhurst, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 15/665,126

(22) Filed: Jul. 31, 2017

(65) Prior Publication Data

US 2018/0011001 A1    Jan. 11, 2018

Related U.S. Application Data

(62) Division of application No. 15/090,519, filed on Apr. 4, 2016, now Pat. No. 9,719,911, which is a division
(Continued)

(51) Int. Cl.
*G01N 15/14*    (2006.01)
*G02B 21/00*    (2006.01)
(Continued)

(52) U.S. Cl.
CPC ..... *G01N 15/1475* (2013.01); *G01N 15/1429* (2013.01); *G01N 15/1434* (2013.01);
(Continued)

(58) Field of Classification Search
None
See application file for complete search history.

(56) References Cited

U.S. PATENT DOCUMENTS 3,069,654 A    12/1962  Hough
4,532,422 A    7/1985   Nomura et al.
(Continued)

FOREIGN PATENT DOCUMENTS

CA    1159674 A1    1/1984
EP    0 035 437 A1    9/1981
(Continued)

OTHER PUBLICATIONS

Lee, S-H., et al. Characterizing and tracking single colloidal particles with video holographic microscopy, Optics Express, vol. 15(26), pp. 18275-18282 (Year: 2007).*
(Continued)

*Primary Examiner* — Xiaoyun R Xu
(74) *Attorney, Agent, or Firm* — Foley & Lardner LLP

(57) ABSTRACT

An in-line holographic microscope can be used to analyze on a frame-by-frame basis a video stream to track individual colloidal particles' three-dimensional motions. The system and method can provide real time nanometer resolution, and simultaneously measure particle sizes and refractive indexes. Through a combination of applying a combination of Lorenz-Mie analysis with selected hardware and software methods, this analysis can be carried out in near real time. An efficient particle identification methodology automates initial position estimation with sufficient accuracy to enable unattended holographic tracking and characterization.

15 Claims, 8 Drawing Sheets

Related U.S. Application Data of application No. 13/254,403, filed as application No. PCT/US2010/021045 on Jan. 14, 2010, now Pat. No. 9,316,578.

(60) Provisional application No. 61/145,402, filed on Jan. 16, 2009, provisional application No. 61/171,199, filed on Apr. 21, 2009.

(51) Int. Cl.
  *G03H 1/00* (2006.01)
  *G01N 15/00* (2006.01)

(52) U.S. Cl.
  CPC ....... *G01N 15/1459* (2013.01); *G02B 21/008* (2013.01); *G02B 21/0056* (2013.01); *G02B 21/0068* (2013.01); *G03H 1/0005* (2013.01); *G01N 15/1484* (2013.01); *G01N 2015/003* (2013.01); *G01N 2015/0065* (2013.01); *G01N 2015/1445* (2013.01); *G01N 2015/1454* (2013.01); *G01N 2015/1493* (2013.01); *G01N 2015/1497* (2013.01); *G03H 2001/005* (2013.01)

(56) References Cited

U.S. PATENT DOCUMENTS

| | | |
|---|---|---|
| 4,627,729 A | 12/1986 | Breuckmann et al. |
| 4,740,079 A | 4/1988 | Koizumi et al. |
| 4,986,659 A | 1/1991 | Bachalo |
| 4,998,788 A | 3/1991 | Osakabe et al. |
| 5,095,207 A | 3/1992 | Tong |
| 5,796,498 A | 8/1998 | French |
| 5,880,841 A | 3/1999 | Marron et al. |
| 6,097,488 A | 8/2000 | Grek et al. |
| 6,214,560 B1 | 4/2001 | Yguerabide et al. |
| 6,281,994 B1 | 8/2001 | Horikoshi et al. |
| 6,480,285 B1 | 11/2002 | Hill |
| 6,519,033 B1 | 2/2003 | Quist et al. |
| 6,710,874 B2 | 3/2004 | Mavliev |
| 7,001,721 B1 | 2/2006 | Whitcombe et al. |
| 7,218,112 B2 | 5/2007 | Ladebeck et al. |
| 7,248,282 B2 | 7/2007 | Maddison |
| 7,338,168 B2 | 3/2008 | Cartlidge et al. |
| 7,532,327 B2 | 5/2009 | Bloom et al. |
| 7,839,551 B2 | 11/2010 | Lee et al. |
| 8,119,988 B2 | 2/2012 | Daido et al. |
| 8,299,789 B2 | 10/2012 | Heid et al. |
| 8,331,019 B2 | 12/2012 | Cheong et al. |
| 8,405,395 B2 | 3/2013 | Setsompop et al. |
| 8,431,884 B2 | 4/2013 | Grier |
| 8,680,861 B1 | 3/2014 | Morrone |
| 8,766,169 B2 | 7/2014 | Grier et al. |
| 8,791,985 B2 | 7/2014 | Grier et al. |
| 9,316,578 B2 | 4/2016 | Grier et al. |
| 9,810,894 B2 | 11/2017 | Grier et al. |
| 9,897,675 B2 | 2/2018 | Setsompop et al. |
| 9,933,351 B2 | 4/2018 | Kent et al. |
| 2002/0069242 A1 | 6/2002 | Berns |
| 2003/0021382 A1 | 1/2003 | Iwanczyk et al. |
| 2004/0004716 A1 | 1/2004 | Mavliev |
| 2004/0004717 A1 | 1/2004 | Reed |
| 2004/0072372 A1 | 4/2004 | Seul et al. |
| 2005/0141757 A1 | 6/2005 | Ayache et al. |
| 2006/0127369 A1 | 6/2006 | Carlsberg As |
| 2007/0070303 A1 | 3/2007 | Yonekubo |
| 2007/0242269 A1 | 10/2007 | Trainer |
| 2008/0037004 A1 | 2/2008 | Shamir et al. |
| 2008/0150532 A1 | 6/2008 | Slavin et al. |
| 2009/0059008 A1 | 3/2009 | Ishii |
| 2009/0128825 A1 | 5/2009 | Akcakir |
| 2010/0090694 A1 | 4/2010 | Heid et al. |
| 2010/0259263 A1 | 10/2010 | Holland et al. |
| 2011/0130348 A1 | 6/2011 | Ting et al. |
| 2011/0157599 A1 | 6/2011 | Weaver et al. |
| 2011/0292363 A1 | 12/2011 | Ivey et al. |
| 2012/0177543 A1 | 7/2012 | Battrell et al. |
| 2012/0235678 A1 | 9/2012 | Seiberlich et al. |
| 2012/0256626 A1 | 10/2012 | Adalsteinsson et al. |
| 2013/0038326 A1 | 2/2013 | Amadon et al. |
| 2013/0271135 A1 | 10/2013 | Ozen et al. |
| 2013/0278743 A1 | 10/2013 | Cheong et al. |
| 2013/0308135 A1 | 11/2013 | Dubois et al. |
| 2014/0170735 A1 | 6/2014 | Holmes |
| 2014/0177932 A1 | 6/2014 | Milne et al. |
| 2014/0253126 A1 | 9/2014 | Habara et al. |
| 2014/0313510 A1 | 10/2014 | Schmidt et al. |
| 2015/0002150 A1 | 1/2015 | Weissler et al. |
| 2015/0062587 A1 | 3/2015 | Shpaisman |
| 2015/0300963 A1 | 10/2015 | Haidekker et al. |
| 2015/0301141 A1 | 10/2015 | Griswold et al. |
| 2015/0346300 A1 | 12/2015 | Setsompop et al. |
| 2016/0116559 A1 | 4/2016 | Cohen |
| 2016/0282436 A1 | 9/2016 | Cloos |
| 2016/0291105 A1 | 10/2016 | Knoll et al. |
| 2016/0291107 A1 | 10/2016 | Rosen et al. |
| 2019/0033414 A1 | 1/2019 | Sofka et al. |
| 2019/0033415 A1 | 1/2019 | Sofka et al. |

FOREIGN PATENT DOCUMENTS

| | | |
|---|---|---|
| EP | 0 278 714 A2 | 8/1988 |
| EP | 1 855 081 A1 | 11/2007 |
| EP | 1 865 430 A2 | 12/2007 |
| JP | 55-096976 A | 7/1980 |
| JP | 03-251888 A | 11/1991 |
| JP | 2000-225302 A | 8/2000 |
| JP | 2001-034148 A | 2/2001 |
| JP | 2005-512127 A | 4/2005 |
| JP | 2007-279475 A | 10/2007 |
| JP | 2011-502256 A | 1/2011 |
| JP | 2011-525967 A | 9/2011 |
| JP | 2014-503794 A | 2/2014 |
| WO | WO-03/048868 A1 | 6/2003 |
| WO | WO-2005/027031 A2 | 3/2005 |
| WO | WO-2006/034129 A2 | 3/2006 |
| WO | WO-2008/092107 A1 | 7/2008 |
| WO | WO-2008/127410 A2 | 10/2008 |
| WO | WO-2009/059008 A1 | 5/2009 |
| WO | WO-2012/061752 A2 | 5/2012 |
| WO | WO-2013/080164 A1 | 6/2013 |
| WO | WO-2013/126554 A1 | 8/2013 |

OTHER PUBLICATIONS

Pawashe, C. et al. Two-dimensional vision-based autonomous microparticle manipulation using a nanoprobe, Journal of Micromechatronics, vol. 3, No. 3-4, pp. 285-306 (2006) (Year: 2006).*

Lee, S-H. et al. Holographic microscopy of holographically trapped three-dimensional structures, Optics Express, vol. 15(4), pp. 1505-1512 (Year: 2007).*

Cheong, et al., "Flow visualization and flow cytometry with holographic video microscopy," Optics Express 17(15), pp. 13071-13079 (2009).

Colomb, et al., "Polarization microscopy by use of digital holography: application to optical-fiber birefringence measurements," Applied Optics 44(21), pp. 4461-4469 (2005).

Denis, et al., "Direct Extraction of the Mean Particle Size from a Digital Hologram," Applied Optics 45(5), pp. 944-952 (2006).

Haist, et al., "Using Graphics Boards to Compute Holograms," Computing in Science & Engineering 8, pp. 8-13 (2006).

Kao & Verkman, "Tracking of single fluorescent particles in three dimensions: use of cylindrical optics to encode particle position," Biophysical Journal 67(3), pp. 1291-1300 (1994).

Kolomenkin, et al., "Geometric Voting Algorithm for Star Trackers," IEEE Transactions on Aerospace and Electronic Systems 44(2), pp. 441-456 (2008).

Moreno, et al., "Particle positioning from charge-coupled device images by the generalized Lorenz-Mie theory and comparison with experiment," Applied Optics 39(28), pp. 5117-5124 (2000).

(56) References Cited

OTHER PUBLICATIONS

Pan, et al., "Three-Dimensional Particle Tracking for Dilute Particle-Liquid Flows in a Pipe," Measurement Science and Technology 13(8), pp. 1206-1216 (2002).
Rappaz, et al., "Erythrocytes vol. And refractive index measurement with a digital holographic microscope," Proceedings vol. 6445: Optical Diagnostics and Sensing VII, 644509, 5 pages (2007).
Rappaz, et al., "Simultaneous cell morphometry and refractive index measurement with dual-wavelength digital holographic microscopy and dye-enhanced dispersion of perfusion medium," Optics Letters 33(7), pp. 744-746 (2008).
Sheng, et al., "Digital holographic microscope for measuring three-dimensional particle distributions and motions," Applied Optics 45(16), pp. 3893-3901 (2006).
Strzodka, et al., "Real-Time Motion Estimation and Visualization on Graphics Cards," IEEE Visualization 2004, pp. 545-552 (2004).
Written Opinion for PCT/US2008/081794, dated Feb. 12, 2009, 5 pages.
International Search Report & Written Opinion for PCT/US2010/021045, dated Apr. 30, 2010, 6 pages.
Office Action for U.S. Appl. No. 12/686,036 dated Mar. 27, 2012, 5 pages.
Notice of Allowance for U.S. Appl. No. 12/686,036 dated Aug. 6, 2012, 8 pages.
Office Action for Japanese Patent App. No. 2011/546331 dated Oct. 25, 2012, 2 pages (English translation only).
First Office Action for Chinese Patent App. No. 201080009712.X, dated Dec. 18, 2012, 15 pages (with translation).
Office Action for U.S. Appl. No. 12/740,628 dated Jan. 17, 2013, 29 pages.
Second Office Action for Chinese Patent App. No. 201080009712.X, dated Aug. 12, 2013, 20 pages (with translation).
Office Action for U.S. Appl. No. 13/254,403 dated Jan. 20, 2014, 14 pages.
Third Office Action for Chinese Patent App. No. 201080009712.X, dated Apr. 2, 2014, 18 pages (with translation).
Final Office Action for U.S. Appl. No. 13/254,403 dated Apr. 10, 2014, 8 pages.
Fourth Office Action for Chinese Patent App. No. 201080009712.X, dated Sep. 17, 2014, 8 pages (with translation).
Fifth Office Action for Chinese Patent App. No. 201080009712.X, dated Mar. 11, 2015, 17 pages (with translation).
Office Action for U.S. Appl. No. 13/254,403 dated Mar. 18, 2015, 8 pages.
Final Office Action for U.S. Appl. No. 13/254,403 dated Jul. 1, 2015, 10 pages.
Notice of Allowance for U.S. Appl. No. 13/254,403 dated Dec. 9, 2015, 7 pages.
Notice of Allowance for U.S. Appl. No. 15/090,519 dated Mar. 29, 2017, 9 pages.
Extended European Search Report for European Patent App. No. 10749072.4, dated Feb. 15, 2018, 12 pages.
U.S. Food and Drug Administration, "Guidance for Industry—Immunogenicity Assessment for Therapeutic Protein Products", Aug. 2014, 39 pages.
Aspnes, D.E., "Local-field effects and effective-medium theory: A microscopic perspective", Am. J. Phys., Aug. 1982, 50(8):704-709.
Atherton, T.J., et al., "Size invariant circle detection", Image and Vision Computing, 1999, 17(11):795-803.
Ball, V., et al., "Complexation Mechanism of Bovine Serum Albumin and Poly(allylamine hydrochloride)", J. Phys. Chem. B, 2002, 106(9):2357-2364.
Ballard, D.H., "Generalizing the Hough Transform to Detect Arbitrary Shapes", Pattern Recognition, 1981, 13(2):111-122.
Basim, G.B., et al., "Effect of Particle Size of Chemical Mechanical Polishing Slurries for Enhanced Polishing with Minimal Defects", Journal of the Electrochemical Society, 2000, 147(9):3523-3528.
Ben-Eliezer, N., et al., "A new Model-Based Technique for Accurate Reconstruction of T2 Relaxation Maps from Fast Spin-Echo Data", Proc. Intl. Soc. Mag. Reson. Med., 2013, 21:2453.

Bishop, C.M., "Inverse problems", in Neural Networks for Pattern Recognition, 1995, p. 207, Clarendon Press, Oxford.
Boas, D.A., et al., "Scattering of diffuse photon density waves by spherical inhomogeneities within turbid media: Analytic solution and applications", Proc. Natl. Acad. Sci., May 1994, 91(11):4887-4891.
Bohren, C.F., et al., Absorption and Scattering of Light by Small Particles, 1983, 12 pp., Wiley-VCH Verlag GmbH & Co., KGaA, Weinheim.
Bolognesi, G., et al., "Digital holographic tracking of microprobes for multipoint viscosity measurements", Optics Express, Sep. 26, 2011, 19(20):19245-19254.
Bourquard, A., et al., "A practical inverse-problem approach to digital holographic reconstruction", Optics Express, Feb. 11, 2013, 21(3):3417-3433.
Carpenter, J.F., et al., "Overlooking Subvisible Particles in Therapeutic Protein Products: Gaps That May Compromise Product Quality", Journal of Pharmaceutical Sciences, Apr. 2009, 98(4):1201-1205.
Chang, C-C., et al., "LIBSVM: A Library for Support Vector Machines", ACM Transactions on Intelligent Systems and Technology, 2011, 2(3), 27 pages.
Chang, C-C., et al., "Training v-Support Vector Regression: Theory and Algorithms", Neural Computation, 2002, 14(8):1959-1977.
Chen, Y., et al., "Magnetic resonance fingerprinting (MRF) for rapid quantitative abdominal imaging", Proc. Intl. Soc. Mag. Reson. Med., 2014, 22:561.
Cheong, F.C., et al., "Rotational and translational diffusion of copper oxide nanorods measured with holographic video microscopy", Optics Express, Mar. 29, 2010, 18(7):6555-6562.
Cheong, F.C., et al., "Holographic characterization of individual colloidal spheres' porosities", Soft Matter, 2011, 7(15):6816-6819.
Cheong, F.C., et al., "Holographic microrheology of polysaccharides from Streptococcus mutans biofilms", Rheologica Acta, 2009, 48(1):109-115.
Cheong, F.C., et al., "Strategies for three-dimensional particle tracking with holographic video microscopy", Optics Express, 2010, 18(13):13563-13573.
Cheong, F.C., et al., "Technical note: Characterizing individual milk fat globules with holographic video microscopy", J. Dairy Sci., 2009, 92(1):95-99.
Chia, V.K.F., et al., "A Review of Analytical Techniques for Identifying Contaminants in the Semiconductor Industry", Journal of the IEST, 2002, 45(1):37-44.
Cloos, M.A., et al., "Plug and Play Parallel Transmission at 7 and 9.4 Tesla Based on Principles from Mr Fingerprinting", Proc. Intl. Soc. Mag. Reson. Med., 2014, 22:0542.
Costantino, H.R., et al., "Moisture-Induced Aggregation of Lyophilized Insulin", Pharmaceutical Research, 1994, 11(1):21-29.
Crocker, J.C., et al., "Methods of Digital Video Microscopy for Colloidal Studies", Journal of Colloid and Interface Science, 1996, 179(1):298-310.
Demeule, B., et al., "Characterization of Particles in Protein Solutions: Reaching the Limits of Current Technologies", The AAPS Journal, Dec. 2010, 12(4):708-715.
Den Engelsman, J., et al., "Strategies for the Assessment of Protein Aggregates in Pharmaceutical Biotech Product Development", Pharm Res, 2011, 28(4):920-933.
Dixon, L., et al., "Holographic deconvolution microscopy for high-resolution particle tracking", Optics Express, Aug. 15, 2011, 19(17):16410-16417.
Dixon, L., et al., "Holographic particle-streak velocimetry", Optics Express, Feb. 28, 2011, 19(5): 4393-4398.
Doneva, M., et al., "Compressed Sensing Reconstruction for Magnetic Resonance Parameter Mapping", Magnetic Resonance in Medicine, 2010, 64:1114-1120.
Dumm, T.F., "Characterization of Low-Level, Oversize Particles in Abrasive Powders", KONA Powder and Particle Journal, 2003, 23:129-138.
Filipe, V., et al., "Critical Evaluation of Nanoparticle Tracking Analysis (NTA) by NanoSight for the Measurement of Nanoparticles and Protein Aggregates", Pharmaceutical Research, May 2010, 27(5):796-810.

(56) References Cited

OTHER PUBLICATIONS

Fung, J., et al., "Imaging Multiple Colloidal Particles by Fitting Electromagnetic Scattering Solutions to Digital Holograms", Journal of Quantitative Spectroscopy and Radiative Transfer, 2012, 113(18):2482-2489.

Fung, J., et al., "Measuring translational, rotational, and vibrational dynamics in colloids with digital holographic microscopy", Optics Express, Apr. 25, 2011, 19(9):8051-8065.

Goller, M.I., et al., "Inorganic "silicone oil" microgels", Colloids and Surfaces A: Physicochemical and Engineering Aspects, 1997, 123-124:183-193.

Goodman, J.W., "Statistical Properties of Laser Speckle Patterns", in Laser Speckle and Related Phenomena, Topics in Applied Physics, Dainty, J.C., ed., 2007, pp. 9-75, Springer, Berlin, Heidelberg.

Graesslin, I., et al., "Fully Integrated Whole Body 3T MRI System for Parallel RF Transmission", Proc. Intl. Soc. Mag. Reson. Med., 2007, 15:1007.

Graesslin, I., et al., "Whole Body 3T MRI System with Eight Parallel RF Transmission Channels," Proc. Intl. Soc. Mag. Reson. Med., 2006, 14:129.

Grier, D.G., "A Revolution in Optical Manipulation", Nature, 2003, 424:810-816.

Grier, D., "Downloadable holographic microscopy software written in IDL, the Interactive Data Language," <http://physics.nyu.edu/grierlab/software.html>, 2014, 3 pages.

Hagiwara, et al., "Fractal Analysis of Aggregates Formed by Heating Dilute BSA Solutions Using Light Scattering Methods," Bioscience, Biotechnology, and Biochemistry 60(11), pp. 1757-1763 (1996).

Hannel, et al., "Holographic characterization of imperfect colloidal spheres," Applied Physics Letters 107(14), 141905, 4 pages (2015).

Hillman, et al., "Microscopic particle discrimination using spatially-resolved Fourier-holographic light scattering angular spectroscopy," Optics Express 14(23), pp. 11088-11102 (2006).

Hogg, "Issues in Particle Size Analysis," KONA Powder and Particle Journal 26, pp. 81-93 (2008).

Hollitt, "A convolution approach to the circle Hough transform for arbitrary radius," Machine Vision and Applications 24(4), pp. 683-694 (2013).

Holm, et al., "Aggregation and fibrillation of bovine serum albumin," Biochimica et Biophysica Acta (BBA)—Proteins and Proteomics 1774(9), pp. 1128-1138 (2007).

Hukkanen, E.J., et al., "Measurement of particle size distribution in suspension polymerization using in situ laser backscattering", Sensors and Actuators B: Chemical, 2003, 96(1-2):451-459.

Ishimaru, "Diffusion of light in turbid material," Applied Optics 28(12), pp. 2210-2215 (1989).

Katscher, et al., "Parallel RF transmission in MRI," NMR in Biomedicine 19(3), pp. 393-400 (2006).

Katscher, et al., "RF encoding using a multielement parallel transmit system," Magnetic Resonance in Medicine 63(6), pp. 1463-1470 (2010).

Knoll, et al., "Simultaneous MR-PET Reconstruction Using Multi Sensor Compressed Sensing and Joint Sparsity", Proc. Intl. Soc. Mag. Reson. Med., 2014, 22:0082.

Kosters, et al., "Emrecon: An expectation maximization based image reconstruction framework for emission tomography data," 2011 IEEE Nuclear Science Symposium Conference Record, pp. 4365-4368 (2011).

Krishnatreya, B.J., et al., "Fast feature identification for holographic tracking: the orientation alignment transform", Optics Express, Jun. 2, 2014, 22(11):12773-12778.

Krishnatreya, B.J., et al., "Measuring Boltzmann's constant through holographic video microscopy of a single colloidal sphere", American Journal of Physics, 2014, 82:23-31.

Lee, et al., "Statistics of speckle propagation through the turbulent atmosphere," Journal of the Optical Society of America 66(11), pp. 1164-1172 (1976).

Ma, et al., "Magnetic resonance fingerprinting", Nature 495, pp. 187-193 (2013).

Maret, G., et al., "Multiple Light Scattering from Disordered Media. The Effect of Brownian Motion of Scatterers", Z. Phys. B Condensed Matter, 1987, 65(4):409-413.

Maschke, et al., "Micronization of Insulin by High Pressure Homogenization," Pharmaceutical Research 23(9), pp. 2220-2229 (2006).

Meakin, "Fractal Aggregates", Advances in Colloid and Interface Science 28, pp. 249-331 (1988).

Moyses, et al., "Robustness of Lorenz-Mie microscopy against defects in illumination," Optics Express 21(5), pp. 5968-5973 (2013).

Mueller, et al., "The Alzheimer's Disease Neuroimaging Initiative," Neuroimaging Clinics of North America 15(4), pp. 869-877 (2005).

Nebrensky, et al., "A Particle Imaging and Analysis System for Underwater Holograms," Optical Methods and Data Processing in Heat and Fluid Flow, pp. 79-92 (2002).

Nelles, et al., "Dual-Source Parallel RF Transmission for Clinical MR Imaging of the Spine at 3.0 T: Intraindividual Comparison with Conventional Single-Source Transmission," Radiology 257(3), pp. 743-753 (2010).

Obey, T.M., et al., "Novel Monodisperse "Silicone Oil"/Water Emulsions", Journal of Colloid and Interface Science, 1994, 163(2):454-463.

Omichi, et al., "Fabrication of enzyme-degradable and size-controlled protein nanowires using single particle nano-fabrication technique," Nature Communications 5, 3718, 8 pages (2014).

Orzada, et al., "Design and comparison of two eight-channel transmit/receive radiofrequency arrays for in vivo rodent imaging on a 7 T human whole-body MRI system," Medical Physics 37(5), pp. 22252232 (2010).

Panchal, et al., "Analyzing Subvisible Particles in Protein Drug Products: a Comparison of Dynamic Light Scattering (DLS) and Resonant Mass Measurement (RMM)," The AAPS Journal 16(3), pp. 440-451 (2014).

Parthasarathy, "Rapid, accurate particle tracking by calculation of radial symmetry centers," Nature Methods 9, pp. 724-726 (2012).

Pedregosa, et al., "Scikit-learn: Machine Learning in Python," Journal of Machine Learning Research 12, pp. 2825-2830 (2011).

Perry, et al., "Real-space studies of the structure and dynamics of self-assembled colloidal clusters," Faraday Discussions 159, pp. 211-234 (2012).

Pine, et al., "Diffusing wave spectroscopy," Physical Review Letters 60(12), pp. 1134-1137 (1988).

Quick, "Integrated PET/MR," Journal of Magnetic Resonance Imaging 39(2), pp. 243-258 (2014).

Remsen, et al., "Analysis of Large Particle Count in Fumed Silica Slurries and Its Correlation with Scratch Defects Generated by CMP," Journal of the Electrochemical Society 153(5), pp. G453-G461 (2006).

Roichman, et al., "Influence of Nonconservative Optical Forces on the Dynamics of Optically Trapped Colloidal Spheres: The Fountain of Probability," Physical Review Letters 101, 128301, 5 pages (2008).

Rubinstein, et al., "Recognition of distorted patterns by invariance kernels," Pattern Recognition 24(10), pp. 959-967 (1991).

Savin & Doyle, "Role of a finite exposure time on measuring an elastic modulus using microrheology," Physical Review E 71, 041106, 6 pages (2005).

Savin & Doyle, "Static and Dynamic Errors in Particle Tracking Microrheology," Biophysical Journal 88(1), pp. 623-638 (2005).

Schellekens, "Bioequivalence and the immunogenicity of biopharmaceuticals," Nature Reviews Drug Discovery 1, pp. 457-462 (2002).

Sciammarella, C.A., et al., "Measuring Mechanical Properties of Materials in the Micron Range", Optical Engineering, May 2003, 42(5), 8 pages.

Seifi, et al., "Fast and accurate 3D object recognition directly from digital holograms," Journal of the Optical Society of America A 30(11), pp. 2216-2224 (2013).

Shpaisman, et al., "Holographic microrefractometer," Applied Physics Letters 101, 091102, 3 pages (2012).

Singh, et al., "An industry perspective on the monitoring of subvisible particles as a quality attribute for protein therapeutics," Journal of Pharmaceutical Sciences 99(8), pp. 3302-3321 (2010).

(56) References Cited

OTHER PUBLICATIONS

Siposova, et al., "Depolymerization of insulin amyloid fibrils by albumin-modified magnetic fluid," Nanotechnology 23(5), 055101, 10 pages(2012).
Sluzky, et al., "Kinetics of insulin aggregation in aqueous solutions upon agitation in the presence of hydrophobic surfaces," Proceedings of the National Academy of Sciences 88(21), pp. 9377-9381 (1991).
Smola & Scholkopf, "A tutorial on support vector regression," Statistics and Computing 14(3), pp. 199-222 (2004).
Sorensen, "Light Scattering by Fractal Aggregates: A Review," Aerosol Science and Technology 35(2), pp. 648-687 (2001).
Tolla & Boldridge, "Distortion of Single-Particle Optical Sensing (SPOS) Particle Count by Sub-Countable Particles," Particle & Particle Systems Characterizaion 27(1-2), pp. 21-31 (2010).
Wang, "Protein aggregation and its inhibition in biopharmaceutics," International Journal of Pharmaceutics 289(1-2), pp. 1-30 (2005).
Wang, et al., "Celebrating Soft Matter's 10th Anniversary: Monitoring colloidal growth with holographic microscopy," Soft Matter 11(6), pp. 1062-1066 (2015).
Wang, et al., "Holographic characterization of protein aggregates," Journal of Pharmaceutical Sciences 105(3), pp. 1074-1085 (2016).
Wang, et al., "Stimulus-responsive colloidal sensors with fast holographic readout," Applied Physics Letters 107(5), 051903, 5 pages (2015).
Weber, et al., "A novel 8-channel transceive volume-array for a 9.4T animal scanner," Proceedings of the International Society for Magnetic Resonance in Medicine 16, p. 151 (2008).
Weinbuch, et al., "Micro—Flow Imaging and Resonant Mass Measurement (Archimedes)—Complementary Methods to Quantitatively Differentiate Protein Particles and Silicone Oil Droplets," Journal of Pharmaceutical Sciences 102(7), pp. 2152-2165 (2013).
Witten & Sander, "Diffusion-Limited Aggregation, a Kinetic Critical Phenomenon," Physical Review Letters 47(19), pp. 1400-1403 (1981).
Xiao, K., et al., "Multidimensional optical fractionation with holographic verification", Physical Review Letters 104, 2010, 028302, 4 pages.
Yang, et al., "Spatial coherence of forward-scattered light in a turbid medium," Journal of the Optical Society of America A 16(4), pp. 866-871 (1999).
Ye, et al., "Accelerating Magnetic Resonance Fingerprinting (MRF) Using t-Blipped Simultaneous Multislice (SMS) Acquisition", Magnetic Resonance in Medicine 75(5), pp. 2078-2085 (2016).
Yevick, et al., "Machine-learning approach to holographic particle characterization," Optics Express 22(22), pp. 26884-26890 (2014).
Yip, et al., "Atomic Force Microscopy of Crystalline Insulins: The Influence of Sequence Variation on Crystallization and Interfacial Structure," Biophysical Journal 74(5), pp. 2199-2209 (1998).
Yip, et al., "Structural and Morphological Characterization of Ultralente Insulin Crystals by Atomic Force Microscopy: Evidence of Hydrophobically Driven Assembly," Biophysical Journal 75(3), pp. 1172-1179 (1998).
Zolls, et al., "How subvisible particles become invisible—relevance of the refractive index for protein particle analysis," Journal of Pharmaceutical Sciences 102(5), pp. 1434-1446 (2013).
Basim, G.B., et al., "Effect of Soft Agglomerates on CMP Slurry Performance," Journal of Colloid and Interface Science, 2002, 256(1):137-142.
Feder, J., et al,. "Scaling Behavior and Cluster Fractal Dimension Determined by Light Scattering from Aggregating Proteins", Physical Review Letters, Oct. 8, 1984, 53(15):1403-1406.
Fung, J., et al., "Holographic measurements of anisotropic three-dimensional diffusion of colloidal clusters", Physical Review E, 2013, 88:020302-1-5.
Jones, L.S., et al., "Silicone Oil Induced Aggregation of Proteins", Journal of Pharmaceutical Sciences, Apr. 2005, 94(4):918-927.
Malitson, I.H., "Interspecimen Comparison of the Refractive Index of Fused Silica", Journal of the Optical Society of America, 1965, 55(10):1205-1209.
Ripple, D.C., et al., "Protein Particles: What We Know and What We Do Not Know", Journal of Pharmaceutical Sciences, 2012, 101(10):3568-3579.
Voros, J., "The Density and Refractive Index of Adsorbing Protein Layers", Biophysical Journal, Jul. 2004, 87(1):553-561.
Wu, S-H., et al., "Synthesis of mesoporous silica nanoparticles", Chem. Soc. Rev., May 7, 2013, 42(9):3862-3875.

\* cited by examiner

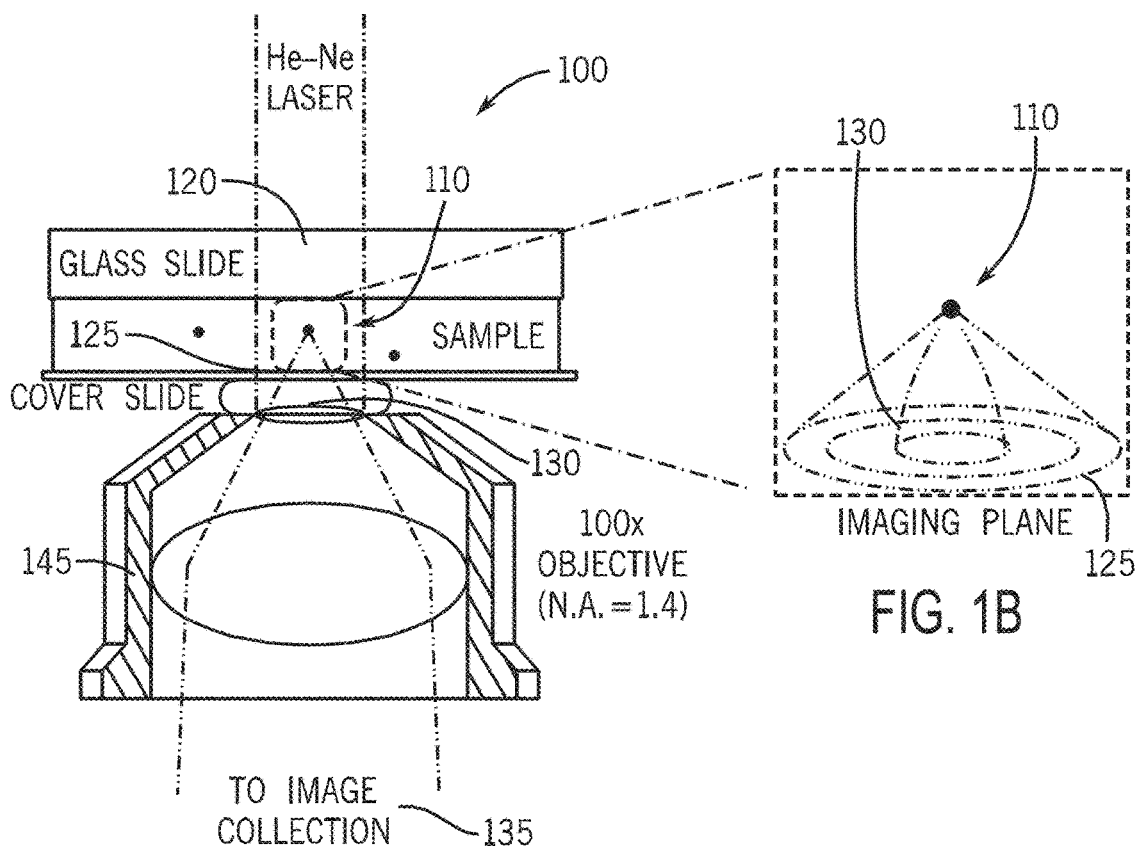
FIG. 1A
FIG. 1B
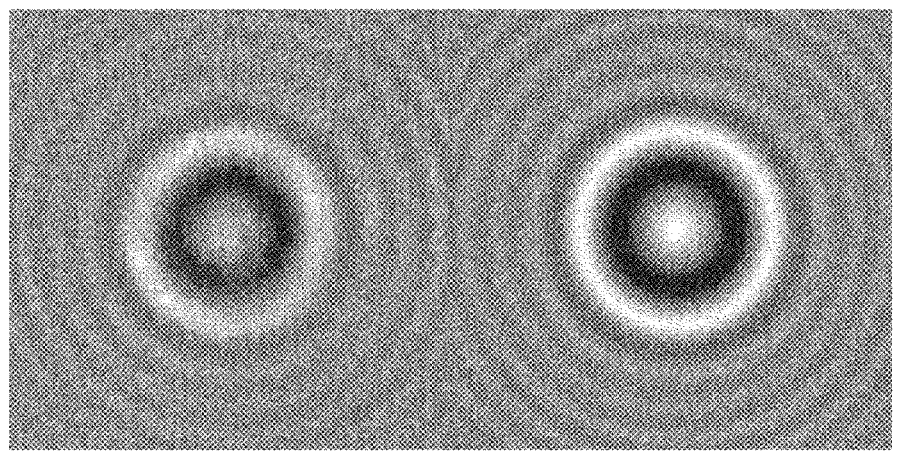
Optical
FIG. 1C(1)
Fitted
FIG. 1C(2)

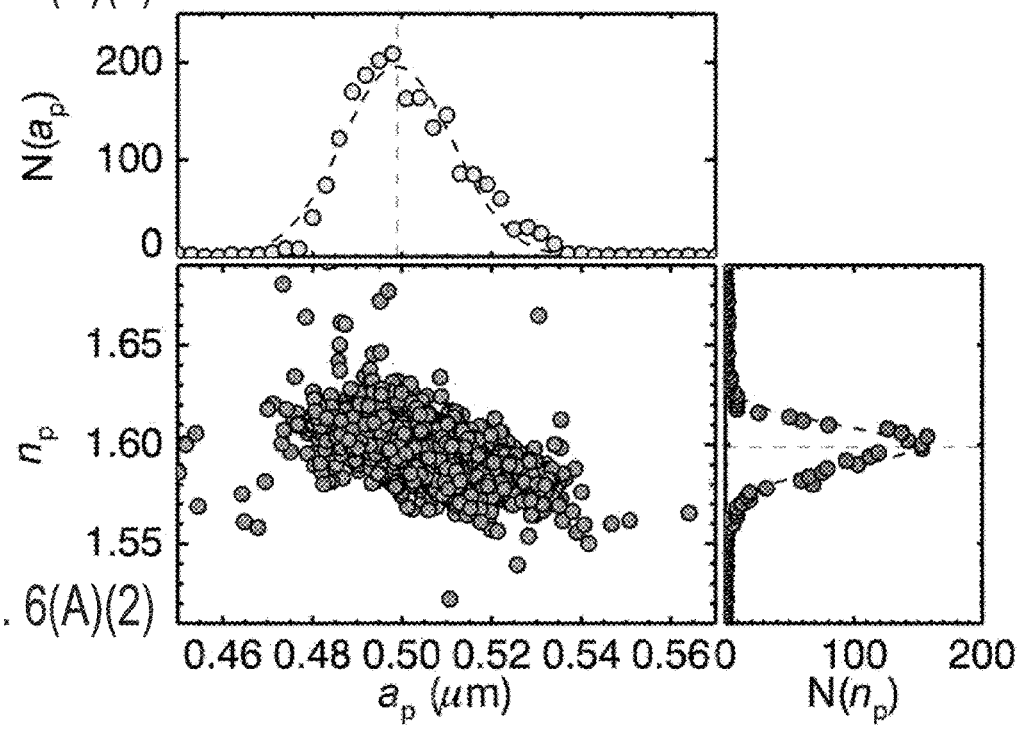
FIG. 6(A)(1)
FIG. 6(A)(2)
FIG. 6(A)(3)
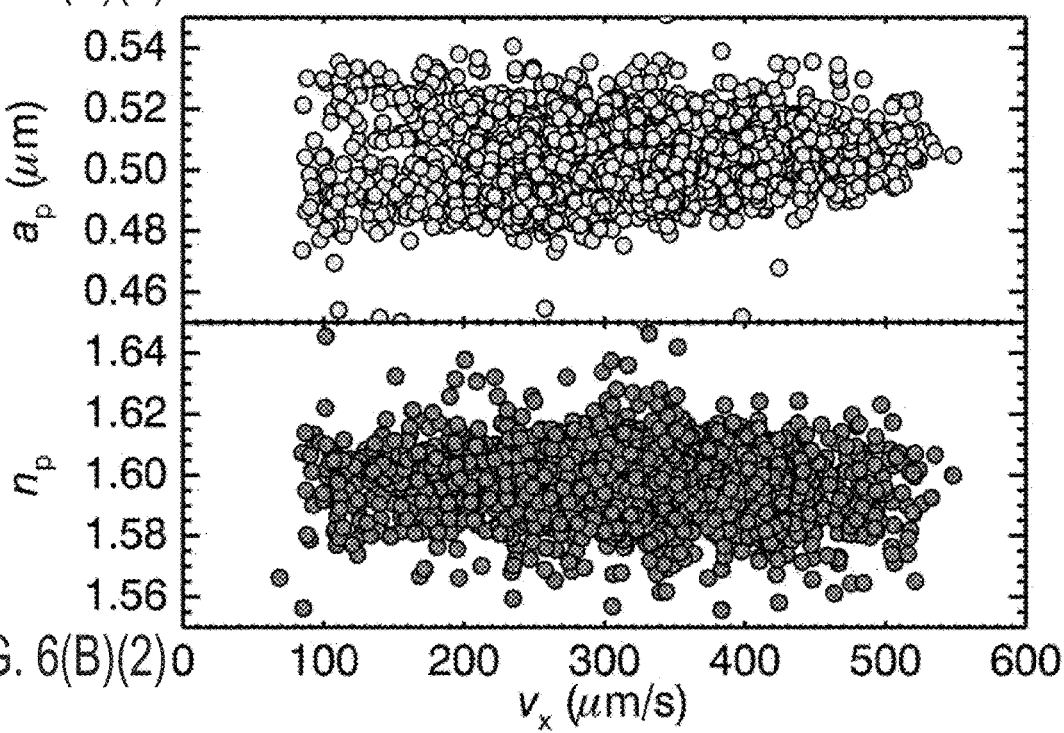
FIG. 6(B)(1)
FIG. 6(B)(2)

AUTOMATED REAL-TIME PARTICLE CHARACTERIZATION AND THREE-DIMENSIONAL VELOCIMETRY WITH HOLOGRAPHIC VIDEO MICROSCOPY

CROSS-REFERENCE TO RELATED PATENT APPLICATIONS

This application is a divisional of U.S. application Ser. No. 15/090,519 filed Apr. 4, 2016, to issue as U.S. Pat. No. 9,719,911 on Aug. 1, 2017, which is a divisional of Ser. No. 13/254,403 filed Feb. 15, 2012 and issued as U.S. Pat. No. 9,316,578 on Apr. 19, 2016, which is a national stage entry of PCT/US2010/021045 filed Jan. 14, 2010, which claims priority benefit of U.S. Provisional Application Nos. 61/171,199 filed Apr. 21, 2009 and 61/145,402 filed Jan. 16, 2009, all of which are incorporated herein by reference in their entirety.

STATEMENT OF GOVERNMENT INTEREST

This work was supported by the National Science Foundation through Grant Number DMR-0606415. The U.S. Government has certain rights pursuant to this National Science Foundation Grant.

BACKGROUND OF THE INVENTION

This characterization of colloidal particles, particularly spheres, is an important and pervasive issue in many aspects of industrial chemical, physical and biomedical applications. A variety of important functionalities are being sought to perform various characterizations including 1) bead based molecular binding assays, 2) flow field measurements, 3) automated particle image detection in holograms, and 4) real time analysis of particle features. For example, coherent illumination traditionally has not been used widely for particle image velocimetry because the resulting holographic images can be difficult to interpret quantitatively. Consequently, measurements of fluoroscence yield has been used to carry out bead based molecular binding assays using holographic imaging in one color. However, such methods require fluorescent labeling with conventional assays requiring tens of thousands of beads to eliminate artifacts to non-specific fluorospore binding and unintentional bleaching. It has been recently demonstrated that holographic video microscopy images of colloidal particles can be used to locate the particles' centers in three dimensions, even when particles occlude each other along the optical axis. Earlier demonstrations using phenomenological models for the observed scattering patterns achieved tracking resolution comparable to that attained with conventional particle imaging methods. The principal benefit of coherent illumination in these studies was the greatly extended working distance and depth of focus compared with conventional imaging methods. However, these methods are inefficient, do not allow any real time analysis to be performed and cannot even perform a number of characterizations (such as the four listed above). Consequently, characterizations mentioned above have not been possible heretofore, have not been commercially feasible or problems remain without apparent solution.

SUMMARY OF THE INVENTION

In therefore an object of the invention to provide a variety of characterization methods and systems for analysis of colloidal particles, such as spheres, in an automated, real-time manner using holographic video microscopy.

BRIEF DESCRIPTION OF THE DRAWINGS

FIG. 1A shows an example of an in-line holographic video microscope; FIG. 1B is a magnified portion of FIG. 1A around the sample; an interference pattern is shown in FIGS. 1C(1) and FIG. 1C(2) shows a fit of FIG. 1C(1) to predictions of Lorenz-Mie theory to obtain various measurements;

FIG. 6A(1) is a distribution of streaming particles as a function of index of refraction and observed sizes for a commercial polystyrene spherical particle continuing sample in water; FIG. 6A(2) is a 2D cross section from FIG. 6A(1) for the particle size and FIG. 6A(3) for index of refraction, both being at the mean value of the other parameter; FIGS. 6B(1) and 6B(2) show trajectory averaged radius and refractive index as a function of mean speed;

DESCRIPTION OF PREFERRED EMBODIMENTS

Figure 2:
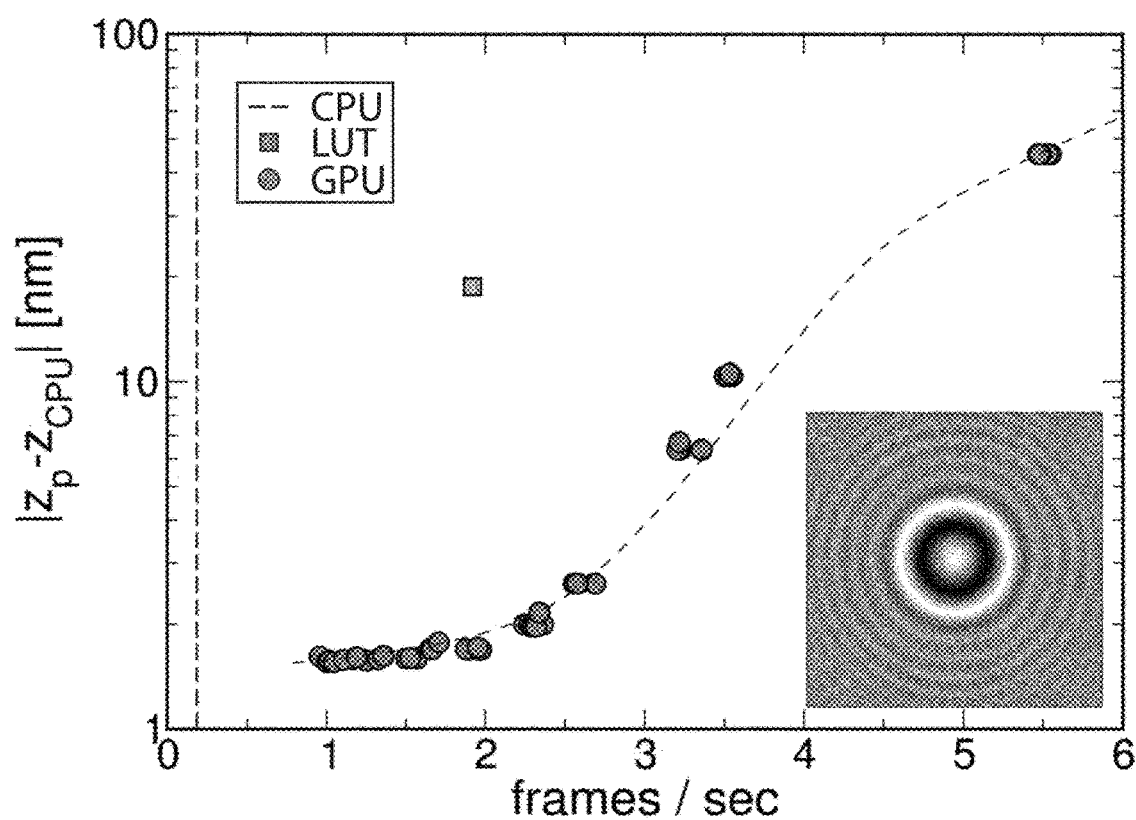
FIG. 2 shows processing speed and relative error in $z_p$ for fits, performed in accordance with the invention, to measured holographic images of a 2.2 µm diameter silica sphere using a one-dimensional look-up-table (squares) and single-precision GPU-accelerated fits (circles); the inset image shows a typical 201×201 pixel hologram and errors are computed relative to the double precision result obtained on a single-thread of the CPU (central processing unit), whose processing rate is indicated by the dashed line and the smooth curve is a guide to the eye.

A holographic microscope 100 constructed for implementation of the invention is depicted schematically in FIG. 1A. Sample 110 is illuminated with the collimated and linearly polarized beam 120 from a HeNe laser operating at a vacuum wavelength of $\lambda=632.8$ nm (Uniphase 5 mW). Other laser wavelengths, such as $\lambda=537$ can also be employed (Coherent Verdi at 5 W). Light 130 scattered by the sample 110 interferes with the unscattered portion of the illuminating beam 120 to form an in-line hologram in the focal or imaging plane 125 of the microscope 100. The resulting heterodyne scattering pattern (see FIG. 1C(1)) is magnified by the microscope's objective lens 145 (Zeiss S Plan Apo 100× oil immersion, numerical aperture 1.4), and projected with a 1× video eyepiece onto a video camera 135 (or plural camera for some Embodiments) (NEC TI-324AII), which records 1 ms exposures every 33 ms with a system magnification of 101 μm/pixel. As described hereinafter this scattering, or interference pattern, is fit to predictions of the Lorenz-Mie theory (see FIG. 1C(2)).

This video signal can be either recorded as an uncompressed digital video stream at 30 frames/s on a commercial digital video recorder (Pioneer H520S) for off-line analysis, or digitized directly with an Arvoo Picasso PCI-2SQ framegrabber to yield an eight-bit image, A(r). Normalizing each image by a previously recorded background image, B(r), eliminates spurious interference fringes due to reflections and imperfections in the optical train and provides the real-valued array $a(r)=A(r)/B(r)$ for analysis. In our implementation, each pixel in the 640/480 array contains roughly five bits of information.

We interpret the data in a(r) using results for generalized Lorenz-Mie scattering theory. The electric field in the microscope's focal plane is the superposition of the incident plane wave, $E_0(r)=u_0(x, y)\exp(ikz)\hat{x}$, and the scattering pattern $E_s(r)=u_0(r_p)f_s(k(r-r_p))$ due to a sphere centered at $r_p$. There, $k=2\pi n_m/\lambda$ is the light's wavenumber in a medium of refractive index $n_m$. After normalization, $$a(r) \approx 1+2\Re\{\exp(-ikz_p)f_s(k(r-r_p))\cdot\hat{x}\}+|f_s(k(r-r_p))|^2. \quad (1)$$

The scattering function may be expanded in a series of vector spherical harmonics $$f_s(kr) = \sum_{n=1}^{n_c} fn(ia_n N_{e1n}^{(3)}(kr) - b_n M_{o1n}^{(3)}(kr)),$$

where $f_n=i^n(2n+1)/[n(n+1)]$. The generalized Lorenz-Mie expansion coefficients, $a_n$ and $b_n$, depend on the size, shape, composition and orientation of the scattering particle in the illuminating field. For a homogeneous isotropic sphere of radius a illuminated by a plane wave of wave number k, these coefficients fall off rapid with order n, and the series is found to converge after a number of terms $n_c=(ka)+4.05(ka)^{1/3}+2$. For a micrometer-scale latex sphere in water, $n_c \leq 30$. The normalized image of an individual sphere can be fit to Eq. (1) for the sphere's position $r_p$, its radius a, and its refractive index $n_m$.

Although the scattering coefficients must be computed with great care [10, 11], the numerical challenge presented by Eq. (2) is in evaluating the vector spherical harmonics $M_{o1n}^{(3)}(k(r-r_p))$ and $N_{e1m}^{(3)}(k(r-r_p))$ at each pixel in a(r) for each trial value of $r_p$. Each sphere's image can subtend tens of thousands of pixels, and the functions typically must be evaluated hundreds of times in the course of each nonlinear fit. Even with the best conventional computationally efficient formulations of the relevant special functions, a fully converged fit can take several seconds on a single processor.

One most preferred form of the invention concerns methods to accelerate these fits using the Lorenz-Mie technique combined with particular programming steps. As will be shown hereinafter this methodology reveals solutions to problems and enables commercially effective characterizations, wherein those solutions were not even previously available. One of our reference systems consists of micrometer-scale latex spheres freely diffusing in water at room temperature, whose normalized hologram is shown in FIG. 1C(1). We analyze images such as this with software developed in the IDL programming language (ITT Visual Information Solutions, Boulder, Colo.), taking advantage of the MPFIT suite of Levenberg-Marquardt nonlinear least-squares fitting routines. These fits typically yield the particle's in-plane position to within 3 nm, its axial position to within 10 nm, its radius to within 1 nm and its refractive index to within 1 part in $10^4$. Error estimates obtained from uncertainties in the fit parameters are independently confirmed by dynamical measurements.

Much of the computational burden of fitting Eq. (1) to a normalized holographic image can be relieved by evaluating $f_s(kR)$ along the line segment $R=|r-r_p|$ and then interpolating to obtain $f_s(k(r-r_p))$. This approach exploits the approximate radial symmetry of a(r) about the particle's center. The data in FIG. 2 demonstrate the substantial reduction in processing time attained in this way. Although expedient, one-dimensional look-up tables do not account for slight polarization-dependent asymmetries in spheres' image, and can fail to capture rapidly varying features in a(r). Consequently, results for the particle's position and characteristics obtained from interpolated fits differ slightly from reference value obtained with two-dimensional fits. Under circumstances where precision can be sacrificed for speed, the convergence tolerances on both one- and two-dimensional fits can be relaxed to obtain results with fewer optimization cycles. For instance, accepting tracking errors of 5 nm in plane and 20 nm in the axial direction yields a tracking rate for a 201×201 pixel image of 2 frames/s on a 3.2 GHz Intel Core 2 Duo processor, as shown in FIG. 2.

More substantial gains can be obtained by combining the Lorenz-Mie formalism with exploiting the parallel processing capabilities of a graphical processing unit (GPU) typically used in high-end computer graphics cards. Further detail concerning the GPU will be illustrated hereinafter in reference to FIG. 8 and the computer 200. Whereas conventional CPU-based implementations operate on each pixel in sequence, a GPU-enabled algorithm operates on all pixels simultaneously. We implemented a GPU-enabled computation of $f_s(kr)$ using the GPUlib (Tech-X Corp., Boulder, Colo.) extensions to IDL on an nVidia 280 GTX graphics card (nVidia Corp., Santa Clara, Calif.) installed in the host computer. GPUlib provides access to the underlying CUDA framework for mathematical computation on GPUs without requiring the sophisticated programming techniques typically required to implement mathematical computations on GPUs. With these enhancements, two-dimensional fits run with full precision at nearly 3 frames/s, a factor of 20 faster than CPU-based analysis. Accepting 5 nm in-plane resolution and 50 nm axial resolution yields particle tracking and characterization data at more than 5 frames/s, as shown in FIG. 2. The GPU, furthermore, supports multi-threaded operation. When supported by a multi-core CPU, this means that several analyses can proceed in parallel, yielding a proportional increase in total processing speed. This may be considered to be real-time performance in some applications. The meaning of "real time" is that image data from each frame snapshot of image data is available for processing and use before the net frame snapshot arrives. As will be noted hereinafter this allows real time characterization of a particle of a sample, such as for example, of a sample's position, radius and index of refraction, and molecular level coatings like bead based molecular binding features. At least two of these parameters can be determined at a time and can even be all simultaneously. Substantial further acceleration could be attained by implementing the same fitting algorithm in an optimized compiled programming language.

Even if fitting to a particle's image proceeds rapidly enough for real-time applications, analyzing a snapshot requires a preliminary identification of the particles of the sample 110 in the field of view, and starting estimates for the particle's position, size and refractive index that are sufficiently accurate for the fit to converge to the globally optimal solution. This bootstrapping process must be both fast and reliable if holographic analysis is to be useful for unattended automated processing.

Figure 3A:
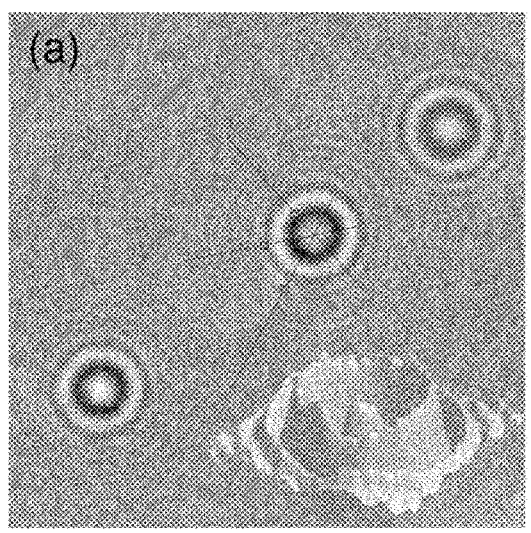
FIGS. 3A and 3B are, respectively, an original and transformed holographic images of three colloidal spheres; superimposed line segments in FIG. 3A indicate the "votes" cast by three representative pixels and intensity in FIG. 3B is scaled by the number of votes, with black representing 0 and white representing 800 votes and superimposed surface plots illustrate the middle sphere's transformation (Scale bar indicates 10 µm.)
Figure 3B:
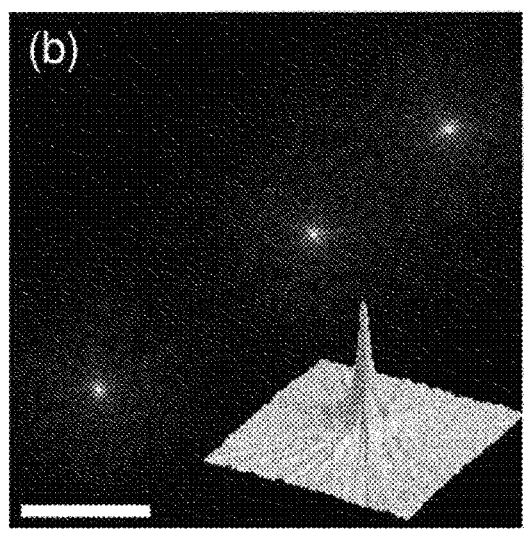

Each sphere appears in a snapshot, such as the example in FIG. 3A, as concentric bright and dark rings. The gradient of the intensity at each pixel therefore defines a line segment in the imaging plane along which a sphere's center may lie. The intersection of such lines defines an estimate for the particle's centroid in the focal plane. In the most preferred embodiment the particle is a sphere. We identify such intersections with a simplified variant of the circular Hough transform in which each pixel in the original image casts "votes" for the pixels in the transformed image that might be centroids. FIG. 3A indicates the votes cast by three representative pixels in the original image. The single-pixel votes are accumulated in a transformed image, such as the example in FIG. 3B. In this case, the transformed image has the same resolution as the original, a choice that yields both reasonable accuracy and speed. Those pixels in the transformed image with the most votes are taken to be centroid candidates, and their locations used as the in-plane coordinates to initialize fits. The inset surface plots demonstrate how the extended interference pattern due to a single sphere is transformed into a sharply defined peak, even if two or more spheres' holographic images overlap. This methodology is more computationally efficient than the conventional circular Hough transform, which uses additional resources to record information about each potential circular region's radius. Refining the centroid estimate by computing the brightness-weighted center of brightness for each feature in the transformed image typically identifies particles' centroids to within a few tenths of a pixel, or a few tens of nanometers.

Having estimated a particle, or sphere's, in-plane coordinates, we then estimate its axial coordinate by back-propagating the measured light field using the Rayleigh-Sommerfeld propagator. Peaks in the reconstructed axial intensity correspond with particle positions to within 100 nm, even when particles occlude each other along the optical axis. This back-propagation can be performed with a one-dimensional slice of image data, centered on the particle's position, and therefore can be performed very rapidly.

Figure 4:
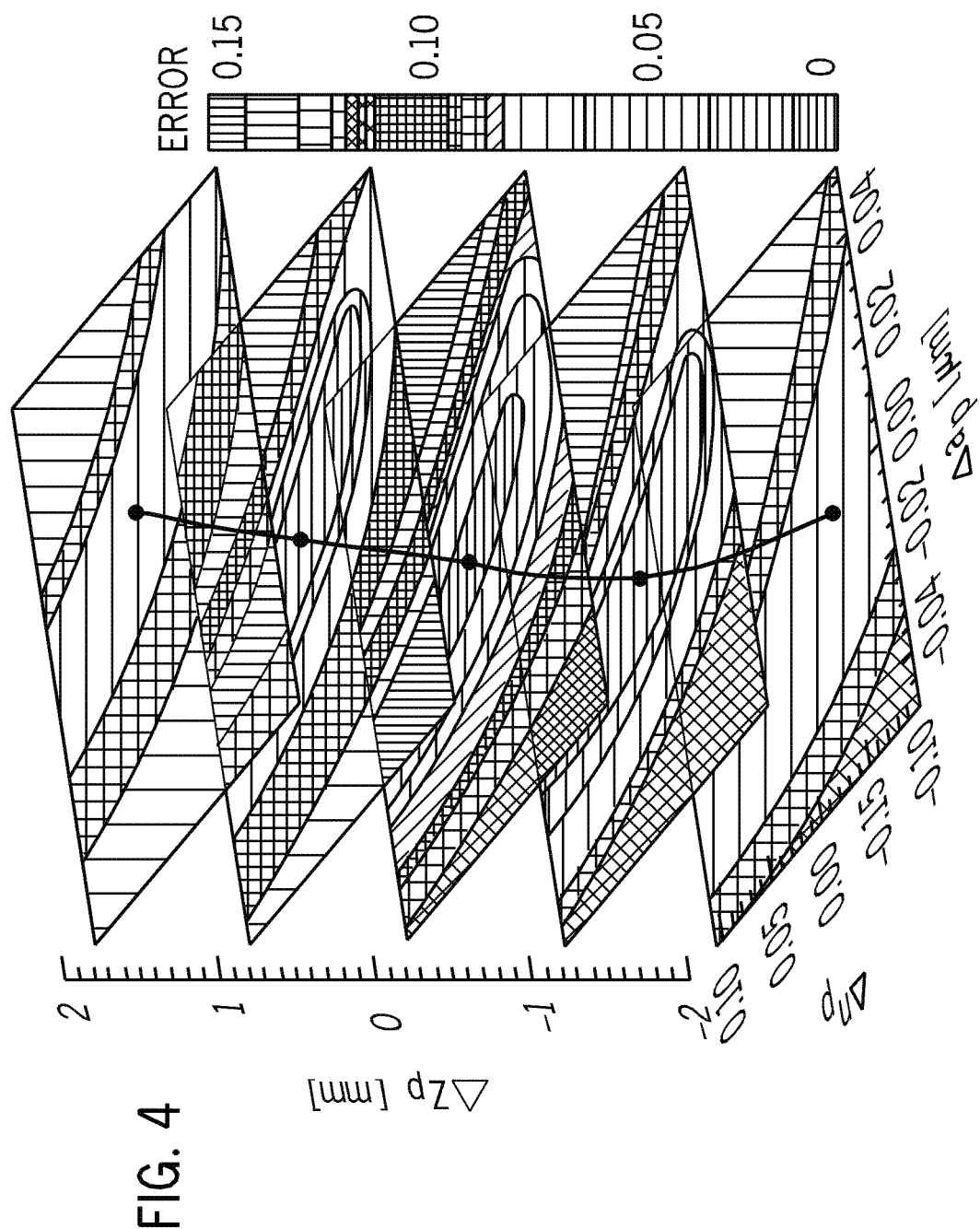
FIG. 4 show the root-mean-square error in the hologram estimated for a 1.5 µm diameter silica sphere in water as a function of the error in radius, $\Delta a_p$, refractive index, $\Delta n_p$, and axial position $\Delta z_p$, where the curve indicates the path of minimum error parameterized by $\Delta z_p$.

Accurately estimating the size and refractive index of an unknown particle is substantially more difficult. Fortunately, the error surface for the nonlinear fits slopes smoothly and monotonically toward the globally optimal values over a very large catchment basin in the parameter space defined by $a_p$, $n_p$, and $z_p$. FIG. 4 shows the root-mean-square error in the local image intensity computed for a 1.5 mm diameter silica sphere in water at $z_p$=20 mm, as a function of $\Delta a_p$, $\Delta n_p$ and $\Delta z_P$ errors in the radius, refractive index and axial position of the particle, respectively. These data demonstrate that fits to such a particle's image should converge to the optimal values even if the initial estimates are in error by more than 0.1 in the refractive index, 0.5 mm in the radius and 2 mm in the axial position. The error surface becomes more highly structured, and thus less forgiving, if the estimated in-plane centroid is in error by more than a hundred nanometers or so. Fortunately, the voting algorithm routinely yields sufficiently accurate results to ensure robust convergence. Tracking a particle through a sequence of images can be further accelerated by using the results from one fit as the initial estimates for the next. In this case, no additional pre-fitting is required.

The combination of rapid centroid identification and accelerated image fitting yields accurate and highly precise measurements of colloidal spheres' positions and characteristics in near or in real time as described hereinbefore. Unattended holographic particle tracking and characterization should find numerous applications in process control and quality assurance as well as in high-throughput and combinatorial assays. Substantial further acceleration should be possible through more aggressive software optimization and parallelization, without recourse to exotic hardware solutions.

Figure 5A:
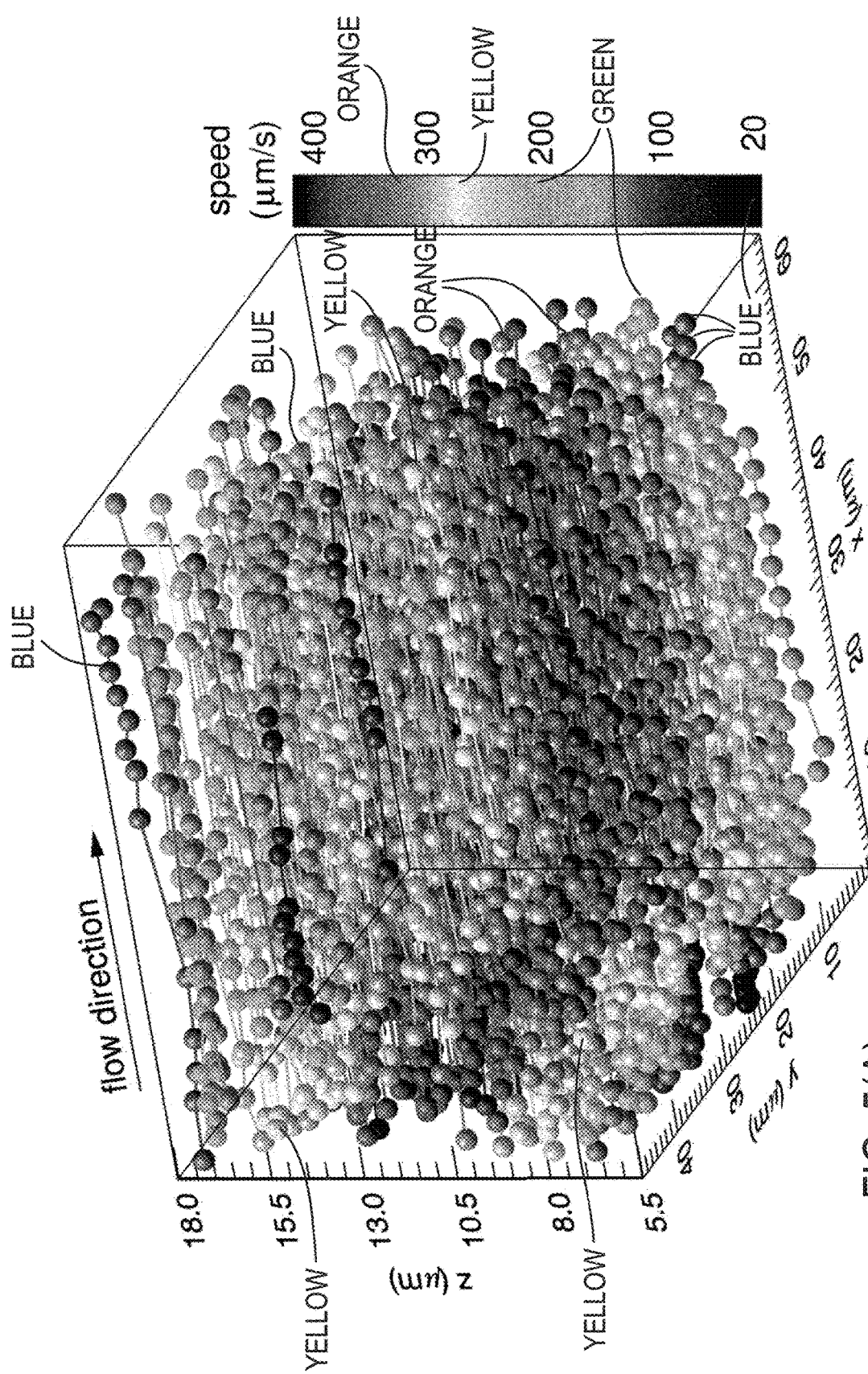
FIG. 5A shows holographic particle image velocimetry measured through dimensional trajectories of 500 colloidal spheres traveling down a microfluidic channel in a pressure driven flow with each sphere representing the particle position in one field of a holographic snapshot and features from field sequences are linked into trajectories with gray scale showing a range of particle measured speeds.

Holographic particle tracking has immediate applications for three-dimensional particle image velocimetry. FIG. 5A shows an example in the form of the superimposed trajectories of 500 individual one micrometer-diameter polystyrene spheres (Duke Scientific, catalog number 5100A) travelling down a 2 cm long microfluidic channel of 100 μm width and 17 μm depth. The spheres were dispersed in water at a volume fraction of $10^{-5}$, and were advected by a pressure-driven flow of water created by raising a reservoir against gravity. Images were obtained in a 50×70 μm² area near the middle of the channel, with the focal plane set roughly 5 μm below the lower glass/water interface. Spheres' locations in each snapshot are linked with a maximum-likelihood formalism approach into single-particle trajectories, $r_p(t)$, sampled at ⅟60 s intervals. Not every time step is represented in each particle's trace because faster-moving particles near the mid-plane of the flow occasionally obscure slower-moving particles near the walls. FIG. 5A presents only those particle positions that were identified unambiguously. Even such incomplete time series can be used to estimate the particles' instantaneous velocities. The traces in FIG. 5A are of a gray scale according to the trajectory-averaged speed.

Figure 5B:
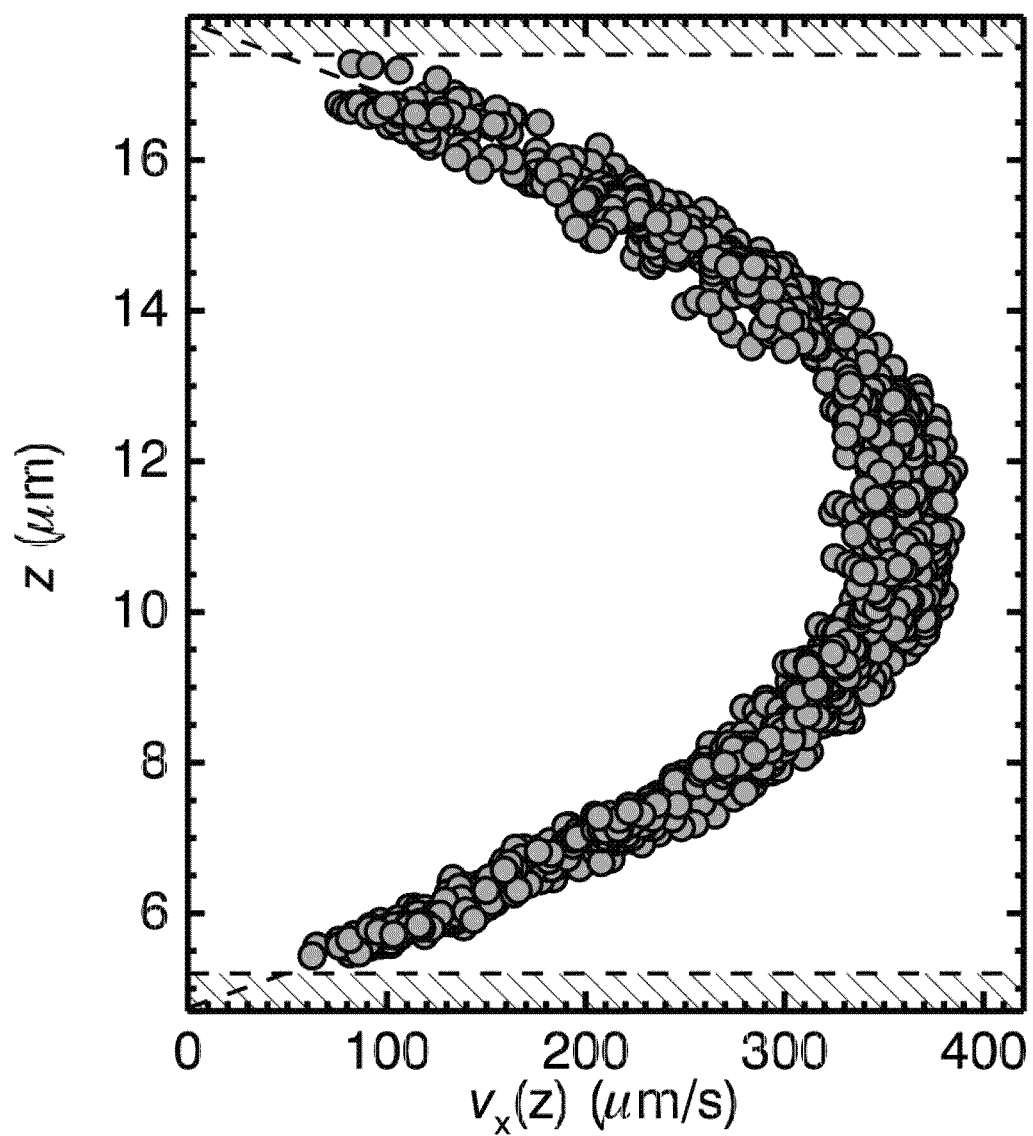
FIG. 5B shows a Poiseuille flow profile along the vertical direction attained from FIG. 5A data with particles excluded from the shaded region by interactions with upper and lower glass walls of the channel (the dashed curve is a fit to the anticipated parabolic flow profile)

These trajectories also are useful for mapping the three-dimensional flow field. Each point in FIG. 5B represents one particle's speed as a function of its mean height, z, in the microfluidic channel. The superimposed results of 1000 such trajectories clearly show the parabolic flow profile expected for Poiseuille flow down a channel, the width of the cluster of data reflecting spatial variations across the long horizontal axis of the channel. The limits of the vertical axis indicate the positions of the channel's upper and lower walls, with heights being reported relative to the microscope's focal plane. The dashed horizontal lines represent the region of the flow into which particles cannot wander because of their hard-sphere interaction with the glass walls. The fit parabola shows the flow vanishing at the channel's boundaries.

Each trajectory also yields trajectory-averaged measurements of the radius and refractive index for each particle individually. Combining multiple measurements on a single particle minimizes systematic errors due to inevitable position-dependent variations in the illumination. The results in FIG. 6A(1)-A(3) show the radii and refractive indexes of the spheres in a commercial sample of polystyrene microspheres dispersed in water. FIGS. 6A(2) and A(3) show the 2D histograms taken from FIG. 6A(1). The mean radius of $a_p=0.4995$ μm agrees with the manufacturer's specification obtained by conventional light scattering, as does the measured 2.5 percent polydispersity in the radius. The mean refractive index of $n_p=1.595$ is consistent with independent measurements on polystyrene spheres.

Single-particle characterization is a substantial benefit of holographic characterization compared with bulk light-scattering measurements, which are the usual basis for analyzing particle dispersions. Building up distributions such as the example in FIGS. 6A(1)-A(3) from single-particle measurements eliminates the need for population models, and thus affords more general insights into a sample's composition. For example, the anticorrelation between the particles' size and refractive index evident in FIGS. 6A(1)-A(3) would not be apparent in light scattering data. No such anticorrelation is apparent in holographic analyses of homogeneous fluid droplets. One interpretation of this observation is that the larger spheres in the emulsion polymerized sample are more porous, and consequently have lower refractive indexes.

Simultaneously tracking and characterizing individual particles(and in real time as described hereinbefore) enables us to confirm our results' freedom from motion-based artifacts. Colloidal particles' images become blurred if they move during the period that the camera's shutter is open. This blurring introduces substantial artifacts into conventional bright-field video microscopy data. As the results in FIGS. 6B(1) and B(2) demonstrate, however, motion blurring has no discernible influence on values for the radii and refractive indexes as a function of mean speed obtained by holographic analysis for speeds as high as 500 μm/s. Additional measurements reveal deviations from the population average values only for peak flow speeds exceeding 700 μm/s.

This robustness is surprising because particles travelling at several hundred micrometers per second traverse several of our camera's pixels during its 1 ms shutter period. The resulting incoherent average of the oscillatory scattering pattern serves primarily to reduce the contrast in the direction of motion, however, and so has little influence on the Lorenz-Mie fit. Even this amount of blurring could be reduced through the use of a faster shutter or a pulsed laser for illumination.

Being able to characterize individual colloidal particles in real time as they travel down a microfluidic channel provides an effective basis for detecting molecular-scale coatings on functionalized beads. If the individual spheres' radii were known to within a nanometer or so, then the presence of a molecular coating of similar refractive index could be discerned in the apparent increase in the radius. More generally, the characteristics of a treated sample can be compared with control measurements on untreated spheres.

Figure 7A:
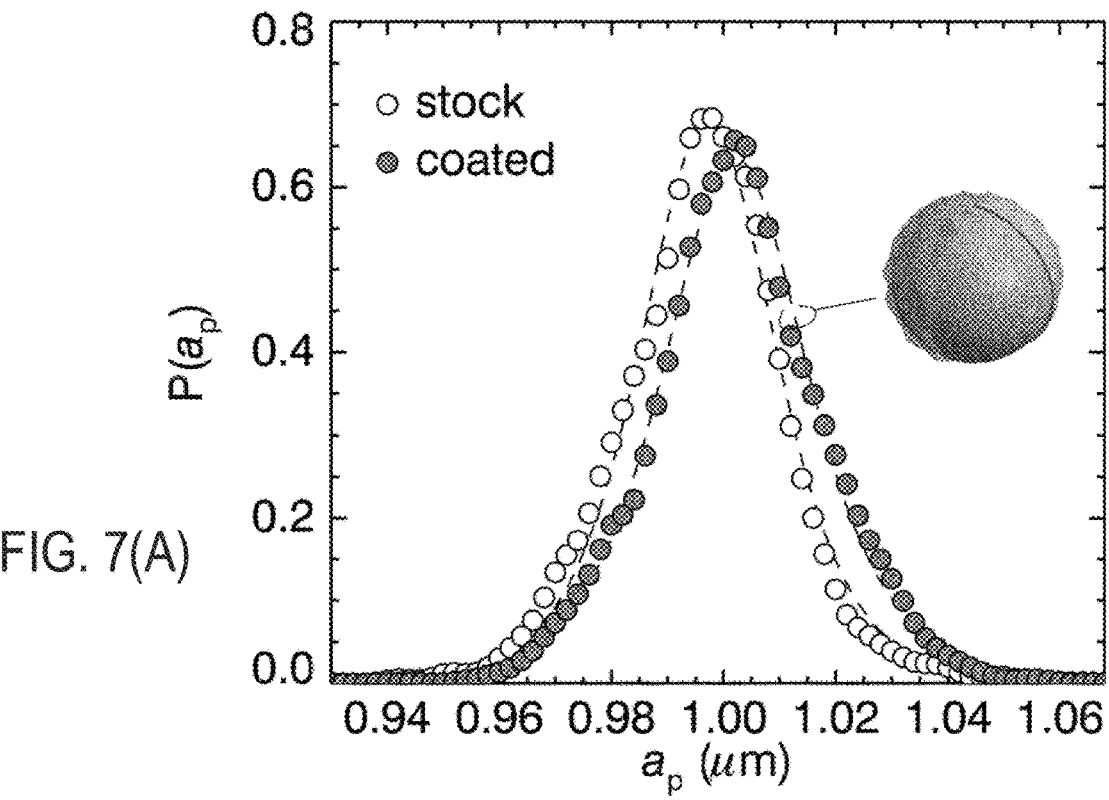
FIG. 7A shows detection of avidin binding to biotinylated polystyrene spheres with light circles the probability distribution for measured particle radius in stock spheres with dark circles having a corresponding distribution for a sample of the sphere after incubation with neutravidin (dashed curves are guides for the eye)
Figure 7B:
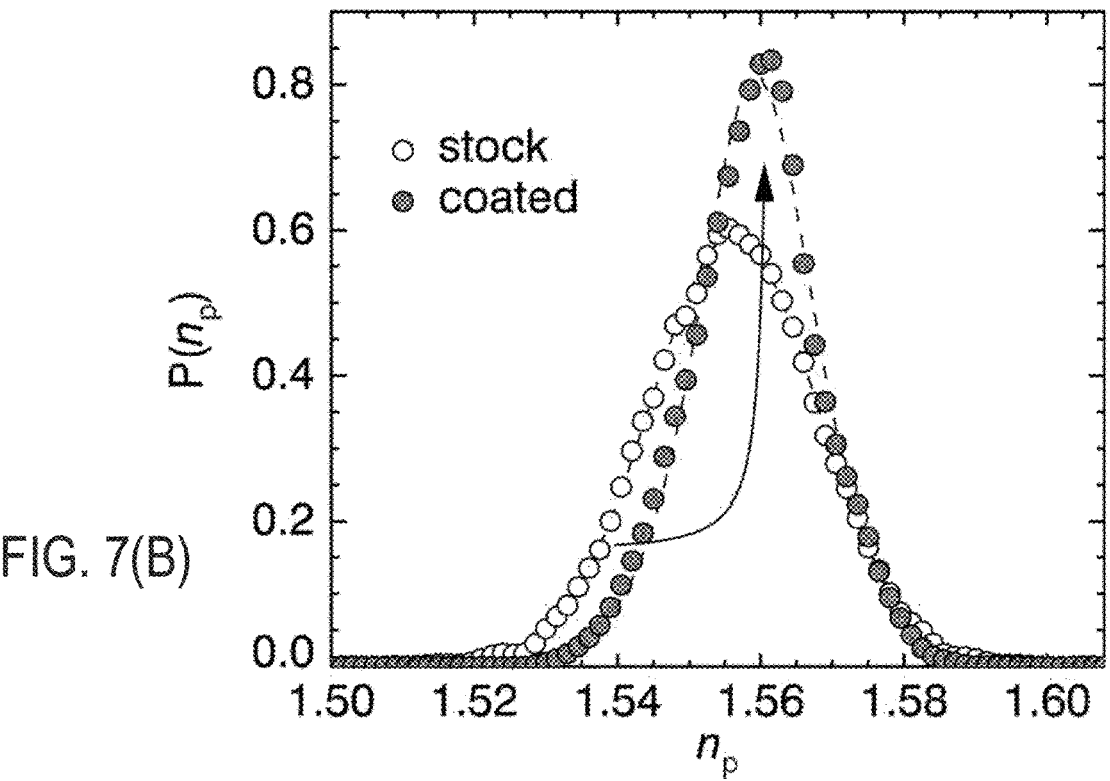
FIG. 7B is the equivalent distribution for particles' refractive indices with the arrow indicating redistribution of probabilities from a low density tail in a stock sample to the peak in the coated sample.

FIGS. 7(A) and 7(B) shows one such comparative example study of 2 μm diameter biotinylated polystyrene spheres before and after incubation with neutravidin. The biotinylated polystyrene spheres used in this study were obtained from Polysciences Inc (Warrington, Pa.) (catalog number 24172). Neutravidin was obtained from Invitrogen (Carlsbad, Calif.) (catalog number A2666). A neutravidin solution at a concentration of 1 mg/mL was prepared by adding 1 mg of neutravidin to 1 mL of phosphate buffer saline (PBS) (50 mM, [NaCl]=50 mM). The stock sample of beads was obtained by adding 10 μL of the as-delivered dispersion to 990 μL of PBS. The coated sample was prepared by adding 10 μL of the as-delivered dispersion to 990 μL of neutravidin solution. Particles were incubated and shaken at room temperature for 1 hr before they were introduced into the microfluidic channels by capillary action. Flow was induced by introducing a slip of absorbent paper into one end of the channel and images recorded until results were obtained for 1,000 spheres from each sample. Each data set consisted of roughly 5,000 holographic measurements, which were obtained over the course of roughly 5 min.

From these measurements, we determined that the untreated sample has a population averaged radius of 0:996±0:015 μm (see FIG. 7A), consistent with the manufacturer's specification. The incubated population appears to some 6 nm larger, with an average radius of 1:002±0:015 μm. Even though the two size distributions plotted in FIG. 7A overlap substantially, a Wilcoxon rank-sum test demonstrates that their means differ with better than 99 percent certainty. This then constitutes a statistically significant detection of change in the treated sample's radius, which can reasonably be ascribed to the presence of a molecular-scale coating. The coating's thickness, in this case, is consistent with the size of a multi-domain avidin derivative.

Pronounced differences between the two samples also are evident in the measured distribution of refractive indexes, plotted in FIG. 7B. The incubated sample's distribution is significantly sharper, presumably because protein, whose refractive index is similar to that of polystyrene, displaces water in the spheres' porous surfaces, and raises their effective refractive indexes. This would affect the more porous particles on the lower side of the refractive index distribution more than the denser particles on the high side, thereby sharpening the distribution. The arrow in FIG. 7B indicates this redistribution.

Similar analyses of random samples of the two data sets further confirm that the particles from the untreated sample all come from the same population, whose size and refractive index is consistent with the manufacturer's specification. The treated samples, by contrast show more variability in size, possibly because the thickness and evenness of the bound avidin layer can vary from sphere to sphere.

These results demonstrate the utility of hardware-accelerated digital video microscopy for detecting in real time molecular-scale coatings on functionalized colloidal spheres. Unlike conventional molecular binding assays, holographic analysis does not require fluorescent or radiological markers, and so eliminates the effort and expense ordinarily required to label molecules bound to beads.

Figure 8:
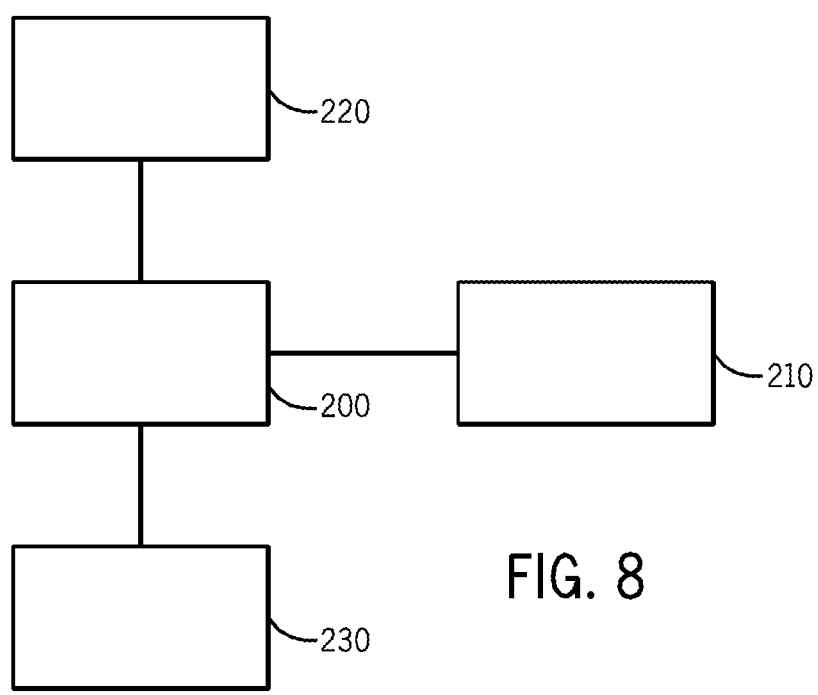
FIG. 8 shows a schematic block diagram of a computer system for implementing the methods of the invention.

In one embodiment of the invention the method of the invention can be implemented to determine parameters and features of interest by use of the computer system shown in FIG. 8. The system of FIG. 8 includes a computer 200 (which can include a CPU and/or GPU in a most preferred embodiment as described herein in connection with Lorenz-Mie analysis) which can execute a computer readable medium, such as a computer software module with instructions which are embedded, for example, in a computer addressable storage medium 210. The use of the GPU in the computer 200 thereby allows real time analysis and simultaneous evaluation of parameters such as molecular coatings and/or of a particle's position, radius and index of refraction. This storage medium 210 can be read/writeable which enables data to be written thereto. This feature allows subsequent static or dynamic data analysis; and results of that analysis allow a user to act on that information for advantageous applications. The computer 200 executes the computer software module instructions to analyze data produced by the previously described methods of the invention. Such data can be obtained from the storage medium 210 and input via device 220. Other conventional devices, such as an output device 230 (e.g., a display, printer and/or a storage medium) can enable viewing and further data analysis. Such analysis can yield information about the position and characteristics of particles in real time or delayed time.

Certain embodiments described hereinbefore use holographic video microscopy in a single wavelength to detect molecular-scale coatings on micrometer-diameter dielectric colloidal spheres. This detection was accomplished by analyzing a population of spheres that had been exposed to the coating molecules and comparing the results with those obtained by analyzing a comparable population of spheres that had not been exposed. Holographic snapshots of individual spheres in each population were analyzed with the Lorenz-Mie theory of light scattering to obtain estimates for the sphere's radius and complex refractive index. Lorenz-Mie analysis yields each sphere's radius with nanometer resolution and its refractive index to within a part in a thousand. The systematic differences in the population distributions of these properties constitute the basis for detecting the molecules. Coated spheres appear systematically larger by an amount consistent with the thickness of the coating.

In an alternative embodiment, the Lorenz-Mie analysis can employ two-color or multi-color holograms to provide comparable detection resolution using only a single sphere, rather than populations of spheres. Thus the input beam 120 in FIG. 1A provides an output of a multi-color hologram. This embodiment creates simultaneous holographic images in two or more wavelengths. These multi-color holograms can be recorded on separate video cameras 135 (see FIG. 1A) using filters to separate the images. Alternatively, they can be recorded with a color camera 135, and the separate images obtained from the recorded color channels.

The spheres used for these types of measurements should have comparable optical properties in the wavelengths used. The coating, however, should have strongly differing properties in at least two of the wavelengths. For instance, the coating might be a pure dielectric in one wavelength and strongly absorbing in another. In the absence of a coating, holograms obtained in multiple wavelengths should yield identical results for the particle's position and size. Coated spheres' holograms should differ significantly in the estimated size and in the qualitative features of the estimated refractive index obtained from each wavelength. Such differences would constitute a detection of the molecular-scale coating. Suitable choice of wavelength, sphere size and sphere composition should provide quantitative information on the thickness or completeness of the coating.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system for characterizing a parameter of a sample by holographic microscopy, comprising:
    a microfluidic fluidic channel configured to receive a flowing sample of particles dispersed in a medium;
    a holographic microscope including a laser beam source and an objective lens, the laser beam scattering from the sample and interacting with an unscattered portion of the laser beam to provide a holographic scattering pattern,
    an image collection device for collecting image data characteristic of the scattering pattern from the holographic microscope; and,
    a computer system including a processor and memory, the memory having stored thereon computer readable instructions, the computer readable instructions configured to:
    machine readable instructions executable by the computer to analyze the image data, the machine readable instructions for:
    receiving holographic image data of the sample;
    determining a first estimate of the number of objects in the holographic image data, each object associated with a set of concentric bright and dark rings;
    determining, for each set of concentric bright and dark rings, by a voting algorithm, a centroid defined by an approximate x, y position in a plane, with each pixel of the image data voting for pixels in a transformed image that may be centroids;
    determining an estimate of the axial position (z) of each of the objects; and
    determining by Lorenz-Mie analysis an estimate of each of the objects' radius and refractive index.

2. The system of claim 1, wherein the holographic microscope includes a plurality of laser beams corresponding to multiple wavelengths and wherein the computer readable memory is configured to receive multi-color holographic image data.

3. The system of claim 1, wherein the machine readable instructions further comprise instructions for comparing one of the radius and refractive index for each of the objects to the same of radius or refractive index of a control uncoated sample.

4. The system of claim 3, wherein the machine readable instructions further comprise instructions for determining for each one of the objects if that one object is coated.

5. The system of claim 1, wherein the computer further comprises a graphical processing unit and wherein the machine readable instructions for determining by Lorenz-Mie analysis an estimate of each of the objects' radius and refractive index and comparing one of the radius and refractive index for each of the objects to the same of radius or refractive index of a control uncoated sample are performed by the graphical processing unit by parallel processing.

6. The system of claim 1, wherein the machine readable instructions further comprise instructions for analyzing the information characteristic of the sample parameters and determining in real time simultaneously size, position and refractive index of a particle of the sample.

7. The system of claim 1, wherein the machine readable instructions for determining the centroid further comprise instructions for determining the Lorenz-Mie functionality scattering function $f_s(kr)$ along a line segment $R=|r-r_p|$ and interpolating to obtain a function $f_s(k(r-r_p))$ thereby reducing processing time and providing real time analysis of the sample.

8. The system of claim 1, wherein the machine readable instructions further comprise instructions for performing the Lorenz-Mie analysis and obtaining comparisons between the image data of a particle being in an untreated state and another particle having undergone a treatment, thereby enabling real time characterization of molecular layers present on the treated particle versus the untreated particle.

9. The system of claim 8, wherein the machine readable instructions further comprise instructions for wherein the real time characteristics are selected from the group of index of refraction and particle radius.

10. The system of claim 8, wherein the machine readable instructions further comprise instructions for estimating in-plane co-ordinates of the particle by the Lorenz-Mie analysis and then estimating axial coordinate of the particle by back-propagating the measured light field applying a Rayleigh-Sommerfeld propagator.

11. The system of claim 1, wherein the machine readable instructions for analyzing further comprise instructions for applying a Levenberg-Marquardt fitting routine to identify the in-plane co-ordinate within 3 nm.

12. The system of claim 1, wherein the machine readable instructions further comprise instructions for determining velocity of the particle in microfluidic channel.

13. The system of claim 12, wherein the machine readable instructions further comprise instructions for mapping a three-dimensional flow field of a state of the particle.

14. The system of claim 2, wherein an associated plurality of holograms are formed by interaction between the sample and the multiple wavelengths of coherent light, thereby enabling determination of different responses of the sample to the different wavelengths of coherent light and analyzing the different response to identify the parameters of the sample.

15. A system for characterizing a parameter of a sample by holographic microscopy, comprising:

a holographic microscope including a laser beam source and an objective lens, the laser beam scattering from the sample and interacting with an unscattered portion of the laser beam to provide a holographic scattering pattern for objects in the sample, an image collection device for collecting image data of the scattering pattern from the holographic microscope; and, a computer system including a processor and memory, the memory having stored thereon computer readable instructions, the computer readable instructions configured to:

machine readable instructions executable by the computer to analyze the image data, the machine readable instructions including transforming the image data using a Hough circular transform to determine by a voting algorithm a first estimate of the number of objects in the image data and the objects approximate x, y position in a plane;

using the transformed data to determine a first estimate of the axial position (z) of each of the objects along with a first estimate of each of the object's size and composition; and applying Lorenz-Mie analysis of the image data for each of the objects to determine a second estimate of the resolution position, size and composition of each of the objects, wherein the second estimate has a higher accuracy than the first estimate with at least one step of updating the storage medium with the results and providing the results for display for interpretation by a user wherein the machine readable instructions for the determination of a centroid further comprise instructions for application of a circular Hough transformation wherein each pixel in an original image votes for the pixels in a transformed image.

\* \* \* \* \*